United States Patent [19]

Thibodeau

[11] 4,219,736

[45] Aug. 26, 1980

[54] APPARATUS FOR PHOTOELECTRICALLY READING A TRANSLUCENT ANSWER DOCUMENT HAVING A BIAS BAR PRINTED THEREON

[75] Inventor: James Thibodeau, Minneapolis, Minn.

[73] Assignee: National Computer Systems, Inc., Minneapolis, Minn.

[21] Appl. No.: 631,828

[22] Filed: Nov. 14, 1975

[51] Int. Cl.$^2$ .............................................. G01V 5/00
[52] U.S. Cl. ................... 250/557; 250/209; 250/571; 250/567; 340/146.3 AG
[58] Field of Search ............... 250/548, 555, 556, 557, 250/208, 209, 569, 568, 567, 566, 571; 235/61.11 E; 340/146.3 AG

[56] References Cited

U.S. PATENT DOCUMENTS

| | | | |
|---|---|---|---|
| 3,159,815 | 12/1964 | Groce | 340/146.3 AG |
| 3,619,569 | 11/1971 | Hoehn et al. | 250/556 |
| 3,654,434 | 4/1972 | Forman et al. | 250/569 |
| 3,683,193 | 8/1972 | Weimer | 250/557 |
| 3,818,189 | 6/1974 | Stone et al. | 250/569 |
| 3,820,068 | 6/1974 | McMillin | 250/568 |
| 3,918,049 | 11/1975 | Snyder et al. | 340/146.3 AG |

*Primary Examiner*—David K. Moore
*Attorney, Agent, or Firm*—Peterson, Palmatier, Sturm & Sjoquist, Ltd.

[57] ABSTRACT

An answer document or form, on which the user darkens certain discrete response areas with a graphite or lead pencil to denote his selected choices or data entries, has a bias bar printed across one end with the same color ink used in printing the remainder of the document. When the document is read by the optical scanner, the light passing through the translucent paper also passes through the printed bias bar. Analog voltage signals are obtained from each of the photocells in the optical scanner and these signals are capacitively stored, then converted to digital values. The digital values are averaged and the individual digital values for each photocell are compared with the computed average to check for bad cells. If a poor photocell response persists for a predetermined number of answer documents, the entire scanning operation is stopped. Concomitantly, a predetermined value is added to the average response value derived from the bias bar so as to provide a light mark threshold with which the various response values obtained from the discrete response areas in each row are compared. Only the photocell values for those response areas having an opacity darker than the light mark threshold, that is those passing the comparison test, are further processed and scored. The need for individually calibrating the various photocells for various types of document paper and ink marks is obviated when utilizing my system.

19 Claims, 3 Drawing Figures

APPARATUS FOR PHOTOELECTRICALLY READING A TRANSLUCENT ANSWER DOCUMENT HAVING A BIAS BAR PRINTED THEREON

BACKGROUND OF THE INVENTION

1. Field of the Invention

This invention relates generally to optical mark readers, and pertains more particularly to a reader or scanning system in which automatic provision is made for opacity differences in the document paper and also in the ink used in printing the document.

2. Description of the Prior Art

In the past it has been necessary to manually adjust or calibrate each photoelectric cell of an optical mark scanner once the paper and ink characteristics were determined for a particular batch of answer documents. This has involved the resetting or "tweeking" of the potentiometer for each of the photoelectric cells. Even so, should the opacity of the document paper vary within a given batch, then the calibration would be incorrect for those sheets deviating from the sheet on which the adjustment was based. The same thing holds true for variations in the opacity of the ink used in printing the various documents or forms.

It can be pointed out that the most common change in ink opacity between batches of answer documents would be in the color of the ink. For instance, red ink barely affects the ink opacity above that of the paper as "seen" by the photocells, whereas blue or green has an appreciable effect. Purple and brown change the opacity to a lesser degree than blue or green but still have a greater influence than red. Also, in the past, no ready check has been available as far as determining whether each photocell is providing a proper response and has become bad. Because of this, a number of answer documents could be incorrectly scored or tabulated before a bad photocell is detected.

SUMMARY OF THE INVENTION

A general object of the invention is to improve the reliability of optical mark readers, more specifically those scanners employed for scoring answer sheets where a number of optical variables may be encountered. An aim of the invention is to obviate the need for calibrating and recalibrating the equipment for changes in paper opacity and/or the opacity of the ink employed in the printing of the documents or forms. It is also within the purview of the invention to automatically provide a threshold level above which response values must reside in order to be scored or tabulated, thereby eliminating or removing the opacity of the paper and/or ink as variable factors in the overall processing operation.

Another object of the invention is to provide a system of the foregoing character that lends itself readily to use with scanning equipment currently being marketed.

Although not actually recommended because of other considerations, another object of the invention is to permit the relaxation of quality control as far as document paper and ink are concerned. Stated somewhat differently, while the main objective of the invention is to process answer documents where the type of paper may vary from batch to batch and also the color of the ink, the system will permit the paper to vary from sheet to sheet within a given batch, both with respect to the optical transmitivity or translucency of the paper and also the opacity of the ink used in printing the sheet. Thus, an aim of my invention is to permit deviations of the foregoing type to occur without sacrificing the scoring or tabulating accuracy and efficiency.

Still further, an object is to provide for automatically shutting down the scanning equipment should there be a malfunctioning of any of the photocells employed in the scanner.

Briefly, my invention involves the printing of a color bias bar on each answer document or form adjacent one end thereof so that, when the various sheets are fed through the optical scanner, analog signals are supplied from the various photocells, the values of the signals being influenced by the opacity of the sheet itself and also the bias bar printed thereon. These analog signals are capacitively stored and then converted into digital values which are averaged, the individual photocell values being compared with the average of the entire number of the photocells in order to determine if a bad cell exists by reason of its value deviating sufficiently from the computed average. Provision is made for counting a predetermined number of documents during a short reading period, and if the bad cell situation continues for the entire predetermined count, then the scanning equipment is automatically shut down. Use is also made of the digital average determined via the color bias bar to provide a threshold level above which all response values must lie in order to be considered in the scoring or tabulating process that follows. Consequently, any optical effect attributable to paper opacity and/or ink opacity is for all intents and purposes eliminated from the scoring procedure.

BRIEF DESCRIPION OF THE DRAWINGS

DESCRIPTION OF THE PREFERRED EMBODIMENT

Figure 1:
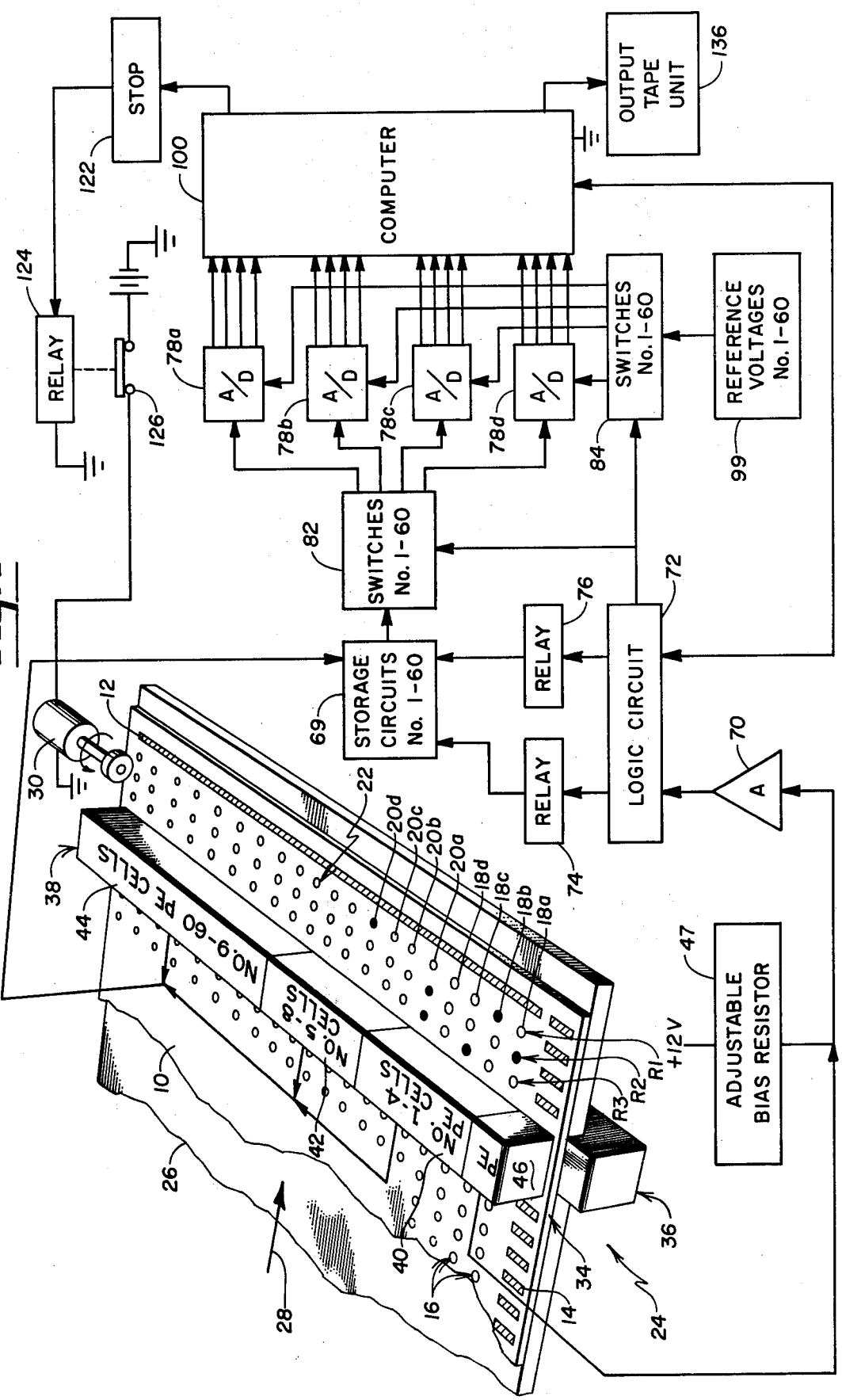
FIG. 1 is a perspective view of a system exemplifying my invention, the system depicting an answer sheet having a bias bar printed thereon in the process of passing beneath a photoelectric reading head.

Referring first to FIG. 1, an answer sheet exemplifying the document to be read in this instance has been indicated generally by the reference numeral 10, the answer sheet being of translucent paper. The answer sheet 10 has a colored bias bar 12 extending across the forward end of the sheet. Extending along one side or marginal portion of the sheet 10 is a timing track composed of a series of marks 14. Additionally printed on the sheet 10 are various discrete answer areas or bubbles 16 that are arranged in column or row form for the sake of easy presentation. However, these areas, as far as my invention is concerned, do not have to be oriented in any particular pattern and may be located without regard to relative position.

As indicated above, the various discrete response areas or bubbles 16 are arranged in rows and it will be helpful, it is thought, to give various reference characters to certain of the rows and individual areas contained therein. Hence, it will be observed that the first row has been given the reference numeral R1, the second row R2 and the third row R3; the additional rows on the sheet 10 need not be identified. It will also be of assistance, it is believed, to subdivide each row R1, R2 and R3 into various groups or grids which include four response areas. Therefore, the first row R1 contains a first group of four response areas 18, each being differentiated by the suffix a, b, c or d. A second group of discrete response areas in the first row R1 has been given the reference numeral 20 with similar letter suffixes.

While any number of response areas or bubbles 16 can be printed on a given sheet, for the sake of illustration it will be assumed that each of the rows contain 60 response areas which are abreast of each other on the sheet 10. Consequently, the areas 18 and 20 total only eight, thereby leaving 52 additional response areas which have been grouped and labeled by the single reference numeral 22; this permits the sheet 10 to be shown on a much smaller scale in FIG. 1 than would otherwise be possible. Because of the reduced scale, only the groups 18 and 20 of row R1 have been shown with marked or filled-in areas, these carrying the specific designations 18b and 20d. The group of areas denoted generally by the reference numeral 22, owing to the small scale of the sheet 10 do not contain any marked areas that are visible. It will be recognized, however, that the examine will have marked selected areas within the grids of this particular group 22 as well as in the groups 18 and 20. For purposes of illustration, in row R2 the response areas 18a and 20a have been darkened, whereas in row R3 the response areas 18c and 20a have been darkened. Thus, where the document to be scanned constitutes the answer sheet 10 as in the exemplary case, the penciled or marked areas signify answers or choices to questions, although they sometimes denote other requested information. Where other types of documents are involved, the darkened areas naturally represent other kinds of data, depending upon the specific purpose of the document.

It has already been mentioned that the answer sheet 10 is of translucent paper. More will be said hereinafter concerning the opacity of the sheet 10 and also how the invention copes with sheets that might be of different opacity or have different light transmitivities. At the moment, though, it is important to appreciate that the bias bar 12 is printed in the same color and with the same ink as is used to print the various discrete response areas 16, as well as other information, some of which may reside within the various areas 16 (particularly where true and false responses are involved). In the present case, it can be assumed that the answer sheet 10 has been printed with green ink; the bias bar 12 has been hatched to denote green. It might also be explained that sometimes the bias bar will also be printed on the opposite face of the answer sheet as well. The invention accommodates either situation.

The apparatus employed in sensing the data contained on the answer sheet 10 has been simplified as much as possible. In the diagrammatic form in which the apparatus has been pictured in FIG. 1 it will be seen that it has been denoted generally by the reference numeral 24. The apparatus 24 includes a guide plate or trackway 26 and the answer sheet 10 is suitably advanced or fed in the direction of the arrow 28 by means of a motor 30 having a drive roller 32 thereon.

As the sheet 10 moves in the direction of the arrow 28, the bias bar first passes beneath a photoelectric pick-up station labeled 34. The pick-up station 34 is comprised of a lamp block 36 housing a plurality of individual lamps located beneath the level of the guide plate or trackway 26. The lamps contained in the lamp block 36 provide light energy that is directed upwardly via a number of light conductive cylinders or rods, as is conventional, to the underside of the sheet 10, this being through an opening (or openings) in the plate 26. In practice, the pick-up station 34 is located beneath the lamp block 36, being just the opposite from that appearing in FIG. 1, but it is felt that the description will be clearer if the arrangement appearing in FIG. 1 is adopted.

Continuing with the description of the apparatus 24, it will be observed that the pick-up station 34 is additionally composed or comprised of a reading head 38 which also contains a plurality of light conductive cylinders or rods. It is the upper ends of these rods that lead to a similar number of photo diodes 40, as schematically denoted in FIG. 2 by the numerals 40a, 40b, 40c, and 40d. While shown as diodes, in actual practice these sensors are photo transistors. The particular type of photo detector or sensor is not critical in realizing the benefits to be derived from my invention. Therefore, while various terms could be employed such as photoelectric cells, it will be easier to just refer to the various photo sensors as photocells.

Since 60 discrete response areas have been selected for each row R1, R2 and R3 (as well as other printed on the sheet 10 but not identified), it follows that 60 photocells will be required in order to sense any penciled in marks applied to the various response areas by the examinee. The photocells for sensing any information contained in the particular group of response areas labeled 18 for the rows R1, R2 and R3 have been identified by the numerals 40a, 40b, 40c and 40d. Additional groups of photocells 42, 44 are used for sensing the areas contained in the groups 20, 22. Although not shown in FIG. 2, an additional photocell 46 is utilized for sensing the presence or arrival of a particular timing mark 14, this photocell appearing in block form in FIG. 1. The reference numeral 47 denotes an adjustable bias resistor for the timing track photoelectric circuit, the timing track circuit actually comprising the photocell 46 and the adjustable bias resistor 47.

Figure 2:
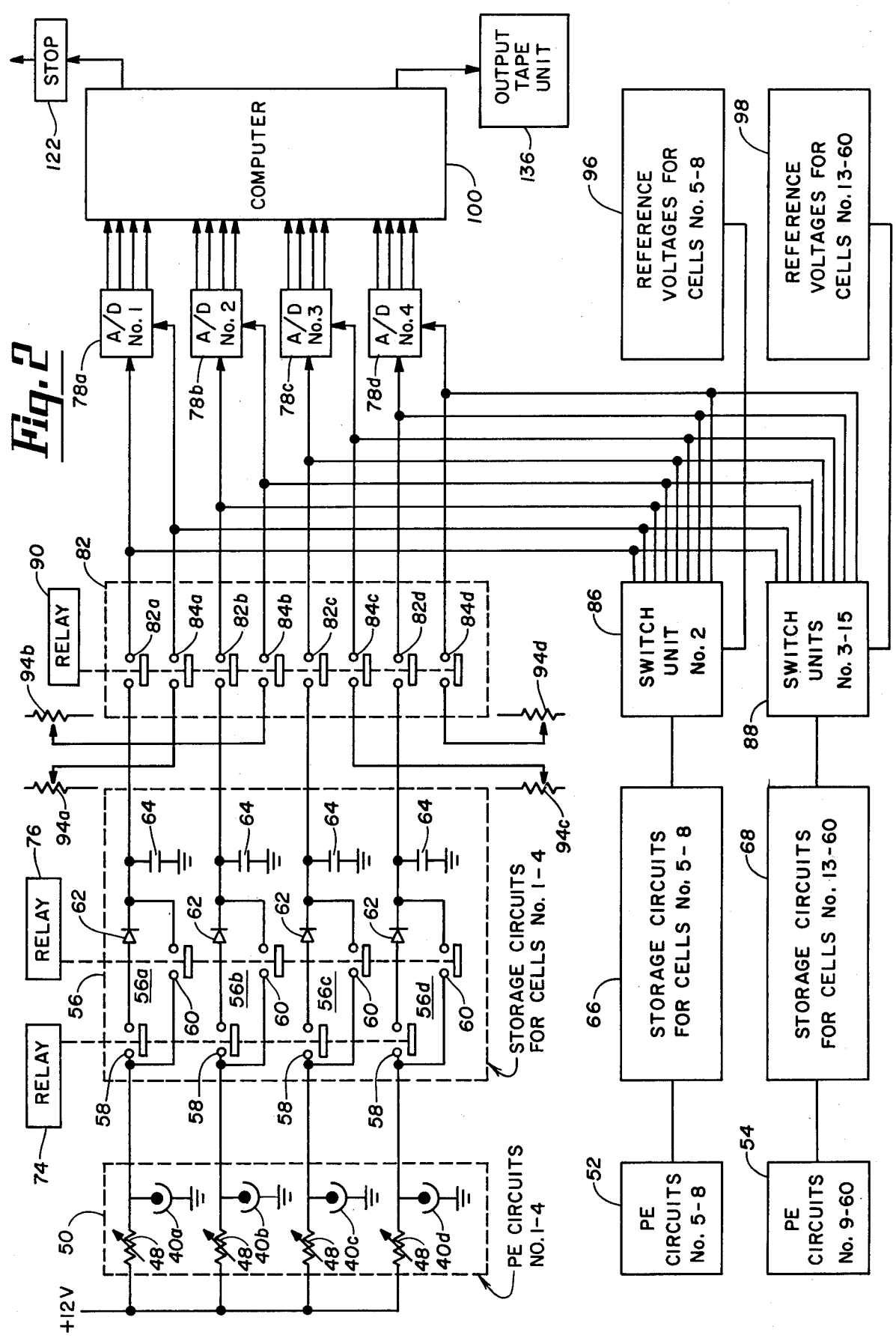
FIG. 2 is a schematic view illustrating in greater detail some of the components appearing in FIG. 1.

Inasmuch as the characteristics or sensitivities of the various photocells are apt to vary with respect to each other, an adjustable bias resistor 48 is shown associated with each cell 40a, 40b, 40c and 40d in FIG. 2, providing a means for calibrating the particular cell 40 with which it is related and also those circuit components associated with the cell. As the description progresses, it will become clearer that, although the adjustable resistors (or in some cases potentiometers) are employed for the purpose of calibrating the various photocells 40, they do not need to be readjusted once they have been properly set when practicing my invention.

Having mentioned the various photoelectric circuits which include the cells 40 and resistors 48, it will be well to assign the reference numeral 50 to the circuitry containing the cells 40a, 40b, 40c and 40d. Additionally, the circuitry for the photocells 42 associated with the reading of information contained in the areas 20 has been given the reference numeral 52. Still further, the remaining circuits containing the cells 44 which read the information contained in the areas 22 have been collectively given the reference numeral 54. It will be appreciated that the blocks 52 and 54 merely denote a duplication or multiplication of the individual circuits schematically presented in the block 50 of FIG. 2.

Now that the foregoing description has been given, it is though evident that the darker the mark applied to any given response area 16, such as the area 18b, the less light will pass through the paper constituting the answer sheet 10. Hence, with less light reaching a given photocell 40 (or 42, 44), the higher its output voltage will be. From FIG. 2, it is to be noted that with +12 volts applied to the various adjustable resistors 48 there is almost a full 12 volt signal at the anode of the photocell 40b when the darkened area 18b is sensed. On the other hand, when no mark is sensed in the response areas, then a substantial amount of light is transmitted through the answer sheet 10, influenced of course by the ink forming such a response area and any information printed therein. Consequently, a considerable amount of current flows, virtually grounding the photocells encountering the unmarked or light areas, and thus causing almost zero voltage to appear rather than almost the 12 volts that appears when a relatively dark mark is passing by.

From the foregoing it will be appreciated, it is believed, that the ink constituting or forming each discrete response area, as well as any letters or other information printed in the response areas, enters into the sensing operation, serving to reduce the amount of light that would otherwise pass through the answer sheet 10 and impinge on the various photocells. The present invention takes into account the opacity of the ink used in printing the answer sheet 10, and of course of any ink printed within and behind the discrete areas on the remainder of the sheet 10 as just explained, this being achieved by literally factoring out the ink level. Also, the effect of any variations in the opacity of the sheet 10 are eliminated at the same time. It might be explained at this point, however, that usually a sheet will not vary in opacity from one end to the other but will do so from sheet to sheet, and particularly from one batch of sheets to the next or to a subsequent batch. Additionally, the ink for a given answer sheet 10 might be relatively uniform throughout, but will vary from sheet to sheet and particularly from batch to batch where different colors are selected for the response areas. The bias bar, which is printed in the same color and with the same quality of ink as the discrete response areas performs the important function of eliminating the effective ink level in the sensing or reading operation, as will become manifest.

The various voltages obtained from the photocells 40 are in analog form. From what has been presented above, it should be appreciated that each voltage is representative of the degree of opacity of the mark placed by the examinee within a response area or bubble 16, the translucency of the sheet 10, and the opacity of the ink. It is intended that the highest voltage resulting from a passing area will be capacitively stored and later converted to a digital value, as will soon be explained.

For the sake of completeness, attention should now be directed to the block 56 containing a plurality of storage circuits 56a, 56b, 56c and 56d, there being one storage circuit for each photocell 40a, 40b, 40c and 40d contained in the circuitry 50. As can be discerned in FIG. 2, each storage circuit 56 includes a series switch 58 and a parallel switch 60, the parallel switch shunting both the switch 58 and a diode 62. The actual storage of the voltage signal forwarded from any given photocell 40 is accomplished by a capacitor 64. Consequently, each storage circuit 56a, 56b, 56c and 56d includes a switch 58, a switch 60, a diode 62 and a capacitor 64.

Corresponding to the storage circuits collectively labeled 56 are additional storage circuits contained in the block 66. In this instance, the storage circuits 66 are connected to the photoelectric circuits 52. Inasmuch as 60 photocells have been selected, there still remain 52 additional storage circuits needed to serve the 52 additional photoelectric circuits labeled 54. These additional storage circuits have been collectively included in the block 68 in FIG. 2. The circuits 56, 66 and 68 have been collectively contained in the rectangle 69 in FIG. 1.

As can be learned from FIG. 1, the photocell 46 for the timing track 14 is connected to an amplifier 70 which in turn is connected to a logic circuit 72. Hence, when the voltage output from the photocell 46 rises to a sufficient value, as it will do when a timing mark 14 passes said photocell 46, this voltage is delivered to the logic circuit 72 which outputs a squarewave signal. The squarewave signal is used for triggering an electronic switch of the solid state type but shown as an electromechanical relay 74 in FIG. 2 and as a simple block in FIG. 1. The relay 74 closes the various series switches 58. Thus, when the relay 74 is energized by reason of a timing mark 14 having caused a sufficient increase in the signal voltage from the photocell 46, as influenced by the bias resistor 47, this voltage prompts the logic circuit 72 to energize the relay 74 that closes the various series switches 58 so that any output signals from the various photocells 40 can be impressed across the storage capacitors 64 contained in the storage circuitry 56. A second relay 76 opens and closes the parallel switches 60, this relay 76 also being controlled by a signal supplied by the logic circuit 72 but on a different time basis.

When the relay 76 is energized to close the switches 60, the capacitors 64 are following exactly what is being delivered to them from the various photocells 40. It is when the parallel switches 60 are open that the diodes 62 are effective to prevent any discharging of the various capacitors 64. Stated somewhat differently, it is when the parallel switches 60 are closed that the diodes 62 are bypassed and the capacitors 64 can then follow the various photocells 40. As soon as the next timing mark 14 comes along, then the parallel switches 60 are all opened, but leaving the series switches 58 closed. The storing process as far as the highest voltage value is concerned is then restarted and the highest value again stored. It will be appreciated that the initial storage is derived from the colored bias bar 12, the magnitude of the various analog voltages being representative of the opacity of the bias bar 12 and the answer sheet 10.

Before the stored response signals, these being derived from the discrete response areas 16, can be processed, the signals obtained from the bias bar 12 are first processed. It has already been mentioned that 60 response or data cells 40, 42, 44 have been selected in the exemplary situation. However, only four analog-to-digital (A/D) converters 78a, 78b, 78c and 78d are utilized to change the various stored analog voltage signals into corresponding digital values. By resorting to multiplexing, the number of A/D converters 78 is minimized and in this instance the multiplexing action permits the use of only four, this approach enabling the analog values to be processed in group sequences.

As with the relays 74, 76 and the switches 56, 60 controlled thereby, which are schematically depicted in FIG. 2, additional switch units have been collectively assembled in the blocks 82 and 84 of FIG. 1, although the individual switches contained in the switch unit 82 have been schematically presented in FIG. 2. A block 86 representing a similar switch unit has been set forth in FIG. 2 and 13 additional switch units, thereby making a total of 15, (since four A/D converters have been selected for the 60 photocells 40, 42 and 44), have been assigned the reference numeral 88.

The individual switches of the switch unit 82 of FIG. 1 have been labeled 82a, 82b, 82c and 82d in FIG. 2 and it will be observed that they are controlled by an electromagnetic relay 90. The four switches 82a, 82b, 82c and 82d are normally open and are in series with the storage circuits 56a, 56b, 56c and 56d and the various A/D converters 78a, 78b, 78c and 78d. The relay 90 also controls the normally open switches 84a, 84b, 84c and 84d contained in the block 84 of FIG. 1 and which in FIG. 2 are shown connected to the A/D converters 78, being instrumental in applying reference voltages from a reference voltage supply labeled 94 in FIG. 1.

The reference voltage supply 94 of FIG. 1 includes four potentiometers 94a, 94b, 94c and 94d as illustrated in FIG. 2. Each voltage reference potentiometer 94a, 94b, 94c and 94d is logically paired to the capacitor storage circuit 56a, 56b, 56c and 56d with which it is associated. The logic circuit 72 exercises supervisory control over the switches 82 and 84. Actually, in the illustrative situation, the logic circuit 72, at the appropriate time, furnishes an energizing signal to the relay 90, causing the various switches 82a, 82b, 82c, 82d and 84a, 84b, 84c and 84d to close.

It will be appreciated that the logic circuit 72 first causes energization of the switches 82 through the agency of the relay 90 so as to forward the stored voltage signals initially derived from the bias bar 12 and sensed by the photocells 40 contained in the circuit 50, these voltages having been stored in the capacitors 64 of the storage circuits contained in the block 56, delivering the stored voltage signals to the four A/D converters 78. At the same time, the voltage reference potentiometers 94 are switched to the A/D converters 78 via the switches 84. It is after this has occurred that the switch unit 86 is energized so as to forward the signals obtained via the photoelectric circuits 52 and the storage circuits 66 associated therewith, along with the reference voltages from the supply 96, to the same A/D converters 78a, 78b, 78c and 78d. Still additional timing is performed in the logic circuit 72 which connects the storage circuits 68 and the reference voltages from the supply 98 to the A/D converters 78 after the switches 84 and 86 have been closed and reopened. It will again be explained that the potentiometers 94 and the two supplies 96, 98 collectively constitute the general supply 99 of FIG. 1. The foregoing provides a multiplexing action that need not be described in any greater detail. All that need be understood is that the various analog signals derived from the photo detectors 40, 42 and 44, there being 60 such signals, are converted four at a time to corresponding digital values.

Since the colored bias bar 12 precedes any of the rows R1, R2 and R3, it follows that the foregoing sensing first involves the obtaining of analog voltages from the various photosensors 40, 42 and 44 which voltages are representative of the amount of light transmitted through the colored bias bar 12 and the paper constituting the sheet 10. Whereas successive rows R1, R2 and R3, these being discrete response areas, arrive thereafter, the bias bar 12 is, as indicated above, the first to pass beneath the reading head 38. These signals are obtained from the photocells 40, 42 and 44 and stored on the capacitors 64 for subsequent conversion to digital values by means of the A/D converters 78, as also explained above.

Figure 3:
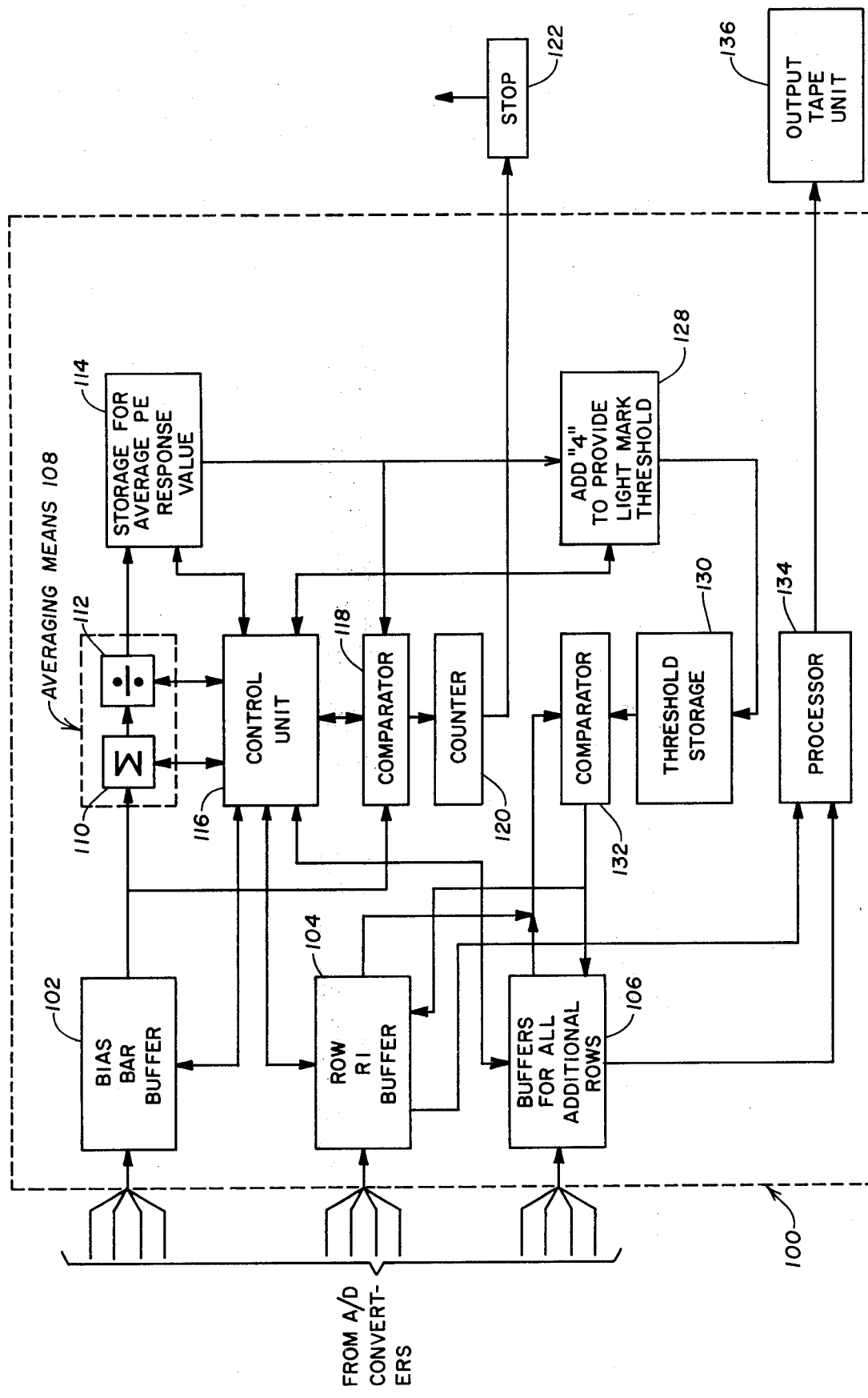
FIG. 3 is a block diagram which is actually a continuation of the diagram presented in FIG. 2.

It will now be helpful, it is believed, to refer to FIG. 3 in order to learn how the values derived from the bias bar, which are in digital form as a result of the conversion operation performed by the converters 78, are processed within a special purpose computer denoted generally by the reference numeral 100. The computer 100 also appears in FIGS. 1 and 2 but the component parts and the functions performed thereby are set forth in FIG. 3.

The computer 100 and the present situation includes a bias bar buffer 102, a buffer 104 for row R1 and buffers for the remaining rows of answer areas including rows R2, R3 and all other rows not specifically enumerated, these being represented by the reference numeral 106. All that need be taken into account at the present moment is that the digital values from the converters 78 are fed to the bias bar buffer 102. It will be appreciated that the bias bar buffer 102 has a capacity sufficient to store the digital values obtained from all 60 photocells 40, 42 and 44.

It can be explained at this stage that it is desired to obtain an average of the 60 digital values stored in the bias bar buffer 102. Accordingly, attention is directed to a section 108 of the computer 100 which computes the average of all 60 digital values stored in the buffer 102. In this regard, means for summing the various digital response values derived from the photocells 40, 42 and 44, which have been stored in the buffer 102, has been given the reference numeral 110. A divider 112 is also included in the means for computing the average digital value, it automatically dividing by 60 since 60 photocells are involved in the illustrative case. The average digital value is stored in the section labeled 114 of the computer 100. By defining the number of photocells actually encompassing a given document, it will be understood that only the number of cells actually involved in sensing should be summed and averaged.

The bias bar buffer 102, the sections 110, 112 and 114 are all under the supervisory control of what will be termed a control unit 116. The control unit 116 also controls other sections of the computer 100 yet to be described. At this time, though, it will be seen that it controls the buffer 104 as well as the buffer 102 and the additional buffers 106.

Attention is now directed to a comparator 118 which compares each of the digital equivalents of the various photocell responses with the average value obtained from the storage 114. Thus, the comparator 118 in FIG. 3 is connected to the bias bar buffer 102 and also to the output of the average photocell response storage 114. The comparator 118 provides an output if there is a sufficient difference between the average digital photocell response value obtained from the bias bar buffer 102.

By means of a counter 120, a counting operation is performed for a selected number of answer sheets 10. Thus, if bad checks persist for a predetermined consecutive number of answer sheets 10, such as five, then such a registration or count is employed as a signal for a stop control device 122 connected to a relay 124 having normally closed contacts 126 in circuit with the motor 30 which advances the sheet 10. This arrangement is believed adequate for the purpose of depicting in a visual manner the shutting down of the apparatus 24 once five bad checks have been determined. The signal from the stop means 122 could be used to disable other portions of the apparatus 24; however, it is the stopping of the drive motor 30 that presents a readily discernible means.

It will also be observed that there is an adding or summing section 128 connected to the storage 114. The role played by the adder 128 is to add a digital value to the average obtained from the storage 114, typically "four". The specific number to be added to the average may be different from the value "four" in that the number should be a function of the type of data contained in rows R1, R2, R3, etc. This provides a light mark threshold that is stored for the particular answer sheet 10 that is being read by the head 38, the storage labeled 130 being utilized for this purpose. This stored light mark threshold digital value is used throughout the scanning of the rows R1, R2, R3 and the remaining rows on the particular answer sheet 10. Accordingly, a comparator 132 is connected to the buffers 104 and 106 so that the digital values derived from the photocells 40, 42 and 44, these being response values, can be compared to the light mark threshold value so that only those response values above the light mark threshold value will be scored.

If each response value from the various rows R1 (stored in buffer 104) and rows R2, R3 and so on (stored in buffers 106) exceed the value of the light mark threshold value, then those digital values, which represent darkened response areas, are taken from the buffers 104 and 106, being delivered to a processing unit 134. It is within the processor 134 that the scoring actually takes place, the processor 134 determining whether a response area contains a correct response or a wrong one. The output from the processor 134 is then delivered to an output tape unit 136 containing a magnetic tape on which the analyzed data is electromagnetically recorded for subsequent playback.

In summary, it can be explained that analog values are first derived from the photocells 40, 42 and 44 as far as the first sheet 10 is concerned and the colored bias bar 12 printed thereon. These analog values are capacitively stored by means of the capacitors 64. The stored analog values are converted to equivalent digital values by way of the A/D converters 78. The converted digital values are stored in the bias bar buffer 102. By reason of the section 108 composed of the subsections 110 and 112 an average digital value is obtained which is representative of the overall 60 digital values obtained from the 60 photocells 40, 42 and 44. The obtained average digital value is stored in the storage section 114.

Each digital value stored in the bias bar buffer 102 is compared with the average digital value stored at 114, this being done by the comparator 118. Simultaneously with the comparison of the individual digital values stored in the buffer 102 with the average digital bias bar value stored in the storage 114, there is added to the average digital value stored in the storage 114 a predetermined digital number, such as four, so as to produce a light mark threshold level.

A new light mark threshold level is obtained or produced for each answer sheet 10. Once the first answer sheet 10 has passed completely beneath the reading head 38, then the next or second answer sheet is read and a new averge stored in the storage 114 and the comparator 118 continues its comparison process so that if a predetermined consecutive number (five having been selected) of bad checks is determined by the counter 120, then the stop means 122 is instrumental in energizing the relay 124 to open the normally closed contacts 126. Although only four converters 78 are employed, the multiplexing action makes it such that digital values for all 60 response areas in each row R1, R2, R3 (and all additional rows) are stored in the buffers 104 and 106. The motor 30, it will be appreciated continually advances the answer sheet 10 with respect to the reading head 38 so that all of this information is picked up and stored in the computer 100. Consequently, only the digital values for those response areas that are above the threshold level stored at 128 enter into the grade or scoring determination. All of the data thus determined is then stored on the magnetic tape of the tape unit 136.

The foregoing steps are repeated for each succeeding answer sheet 10, the counter 120 making certain that there are no more than the predetermined number of bad checks, suggestively five, that occur without shutting down the apparatus 24.

Consequently, my system provides complete assurance that the scanning operation will be reliable. If there is a bad photocell 40, 42 or 44, then only five answer sheets 10 will have been processed before the presence of a bad cell is detected. Not only that, but the system takes into account the particular opacity of the ink used in printing the answer sheets, doing so not only for answer sheets of a specified color but automatically making a change if a second batch of sheets differs in the color of the ink. Still further, unless the digital values derived from the various photocells 40, 42 and 44 are above a given threshold level, they will not be scored. Thus, my system is very discriminating as far as to the opacity of the penciled in marks, this all being in addition to the precautionary measures incorporated into the system as mentioned above.

I claim:

1. In combination, an answer document having a bias bar and various response areas printed thereon, both said bias bar and response areas being printed with ink possessing the same optical characteristics, and optical scanning apparatus for scoring said answer document including first means for deriving a first signal in analog form having a value representative of the optical characteristics of said bias bar, second means for storing a second signal in digital form having a value corresponding to the value of said first signal for subsequent comparison with additional signals derived from said response areas, and means for converting said analog signal to said digital signal, said digital signal having a value which is the substantial digital equivalent of the amplitude of said analog signal, said amplitude being said value representative of the optical characteristics of said bias bar.

2. The combination set forth in claim 1 including a digital computer, said second means constituting a first memory section contained in said computer.

3. The combination set forth in claim 2 in which said first means includes a plurality of photosensors and means for advancing said sheet in a direction so that said bias bar precedes said response areas to provide said first signal and thereafter provide said additional signals, said additional signals also being in analog form, said third means successively converting each of said additional signals from its analog form to corresponding additional digital signals each of which additional digital signals has a digital value which is the substantial digital equivalent of the amplitude of the additional analog signal from which it was derived, said computer having a second memory section for storing said additional digital signals to enable comparison of said additional digital signals with said first-mentioned digital signals.

4. The combination set forth in claim 3 in which said bias bar provides a plurality of first signals in analog form, said third means converting each of said first signals to said second signals each having a digital value which is the substantial digital equivalent of the amplitude of the additional analog signal from which it was derived, and said second means storing all of said second signals.

5. The combination set forth in claim 4 including means for providing a digital signal from said second signals after said second signals have been converted to digital values, said last-mentioned digital signal representing the average of said second signals.

6. The combination set forth in claim 5 including means for comparing each of said second digital signals with said average digital signal.

7. The combination set forth in claim 5 in which said first and second signals are provided for each of successive documents, an average signal is provided for each document and in which said comparison means effects comparison of each second digital signal with each average digital signal to provide an output signal whenever at least a predetermined difference exists between a second digital signal and the average digital signal for each document.

8. The combination set forth in claim 7 including means for counting said output signals, and means for stopping said scanning apparatus whenever a predetermined number of successive output signals is reached.

9. The combination set forth in claim 5 in which said first means also derives analog signals representative of the optical characteristics of said response areas, said third means converting said response analog signals to corresponding response digital signals, means adding a predetermined digital value to said average digital signal to provide a digital threshold signal, and means for comparing each digital response signal with said threshold signal.

10. The combination set forth in claim 9 including means controlled by said digital comparing means for processing only those digital response signals having a value above said threshold signal.

11. The combination set forth in claim 3 in which said bias bar extends transversely across said answer document nearer one end thereof and said response areas are arranged in parallel rows between said bias bar and the other end of said answer document, said answer document having a series of timing marks extending along one edge thereof, there being a timing mark associated with said bias bar and a timing mark associated with each of said response rows, a photosensor triggered successively by said timing marks and means controlled by the photosensor for said timing marks for energizing said plurality of photosensors to produce said first analog signal and to successively provide said additional analog signals, whereby said third means first converts said first analog signal to said second digital signal and subsequently converts said additional analog signals to said additional digital signals.

12. The combination set forth in claim 10 in which said photosensors are located adjacent one surface of said answer document, and light means located adjacent the other surface of said answer document so that said photosensors sense light transmitted through said sheet to provide analog signals representative of the optical characteristics of the ink properties of said bias bar and response areas as well as the opacity of the paper constituting said answer document.

13. The combination set forth in claim 12 in which said computer includes means for averaging the digital signals derived from said bias bar.

14. The combination set forth in claim 13 including means for comparing each of the digital signals derived from the response areas with the average digital signal obtained from said bias bar.

15. The combination set forth in claim 14 including means for adding a predetermined digital value to the average digital value derived from said bias bar to provide a light mark threshold value.

16. The combination set forth in claim 15 including means for comparing said threshold value with the various digital values derived from said response areas.

17. The combination set forth in claim 16 in which said comparing means produces an output signal when a digital value derived from said bias bar for a given photosensor differs by a predetermined amount from the stored average digital value derived from said bias bar.

18. The combination set forth in claim 17 including counting means for consecutively counting the number of outputs from said comparing means for a given number of successive answer documents.

19. The combination set forth in claim 18 including means for stopping the scanning procedure when said counting means reaches a predetermined count or registration, whereby an improperly functioning photosensor is signified.

* * * * *